(12) United States Patent
Okoniewski et al.

(10) Patent No.: US 12,553,321 B2
(45) Date of Patent: Feb. 17, 2026

(54) NON-EQUIDISTANT OPEN TRANSMISSION LINES FOR ELECTROMAGNETIC HEATING AND METHOD OF USE

(71) Applicant: Acceleware Ltd., Calgary (CA)

(72) Inventors: Michal M. Okoniewski, Calgary (CA); Damir Pasalic, Calgary (CA); Pedro Vaca, Calgary (CA)

(73) Assignee: Acceleware Ltd., Calgary (CA)

( * ) Notice: Subject to any disclaimer, the term of this patent is extended or adjusted under 35 U.S.C. 154(b) by 71 days.

(21) Appl. No.: 18/453,417

(22) Filed: Aug. 22, 2023

(65) Prior Publication Data

US 2024/0018857 A1 Jan. 18, 2024

Related U.S. Application Data

(63) Continuation of application No. 16/671,864, filed on Nov. 1, 2019, now Pat. No. 11,773,706.
(Continued)

(51) Int. Cl.
*E21B 43/24* (2006.01)
*E21B 43/30* (2006.01)
*H05B 6/00* (2006.01)

(52) U.S. Cl.
CPC ........ *E21B 43/2401* (2013.01); *E21B 43/305* (2013.01); *H05B 6/00* (2013.01); *H05B 2214/03* (2013.01)

(58) Field of Classification Search
CPC .............. E21B 43/2401; E21B 43/2406–2408
See application file for complete search history.

(56) References Cited

U.S. PATENT DOCUMENTS 2,402,622 A 6/1946 Hansen
2,757,738 A 8/1956 Ritchey
(Continued)

FOREIGN PATENT DOCUMENTS

CA 2816101 A1 5/2012
CA 2895595 A1 12/2015
(Continued)

OTHER PUBLICATIONS

Abdelsayed, V., Ellison, C.R., Trubetskaya, A., Smith, M.W. and Shekhawat, D., 2019. Effect of microwave and thermal co-pyrolysis of low-rank coal and pine wood on product distributions and char structure. Energy & fuels, 33(8), pp. 7069-7082. DOI: https://doi.org/10.1021/acs.energyfuels.9b01105 (Year: 2019).*
(Continued)

*Primary Examiner* — Theodore N Yao
(74) *Attorney, Agent, or Firm* — SMART & BIGGAR LP; Isis E. Caulder; Sunil R. Rao

(57) ABSTRACT

An apparatus and method for electromagnetic heating of a hydrocarbon formation. The method involves providing a producer well, which defines a longitudinal axis, between at least a first and second transmission line conductor. At a reference location along the length of the longitudinal axis, the first and second transmission line conductors are laterally spaced from the producer well by a first and second reference distance, respectively. At a second location, the first and second transmission line conductors are laterally spaced from the producer well by a third and fourth distance, respectively. At least one of the third and fourth distances are greater than the first and second reference distances, respectively. Excitation of the transmission line conductors generates an electromagnetic field having a reference shape and a reference position at the reference location and at least one
(Continued)

of a more elongated shape and a different position at the second location.

6 Claims, 7 Drawing Sheets

Related U.S. Application Data

(60) Provisional application No. 62/772,821, filed on Nov. 29, 2018.

(56) References Cited

U.S. PATENT DOCUMENTS

| | | | |
|---|---|---|---|
| 3,909,757 | A | 9/1975 | Miyamoto et al. |
| 4,135,579 | A | 1/1979 | Rowland et al. |
| 4,140,179 | A | 2/1979 | Kasevich et al. |
| 4,140,180 | A | 2/1979 | Bridges et al. |
| 4,144,935 | A | 3/1979 | Bridges et al. |
| 4,193,451 | A | 3/1980 | Dauphine |
| RE30,738 | E | 9/1981 | Bridges et al. |
| 4,301,865 | A | 11/1981 | Kasevich et al. |
| 4,319,632 | A | 3/1982 | Marr, Jr. |
| 4,320,801 | A | 3/1982 | Rowland et al. |
| 4,449,585 | A | 5/1984 | Bridges et al. |
| 4,470,459 | A | 9/1984 | Copland |
| 4,487,257 | A | 12/1984 | Dauphine |
| 4,490,727 | A | 12/1984 | Kowols |
| 4,508,168 | A | 4/1985 | Heeren |
| 4,513,815 | A | 4/1985 | Rundell et al. |
| 5,236,039 | A | 8/1993 | Edelstein et al. |
| 5,484,985 | A | 1/1996 | Edelstein et al. |
| 6,189,611 | B1 | 2/2001 | Kasevich |
| 6,413,399 | B1 | 7/2002 | Kasevich |
| 6,932,155 | B2 | 8/2005 | Vinegar et al. |
| 7,009,471 | B2 | 3/2006 | Elmore |
| 7,182,151 | B2 | 2/2007 | Stump et al. |
| 7,194,297 | B2 | 3/2007 | Talpade et al. |
| 7,250,916 | B2 | 7/2007 | Kunysz et al. |
| 7,567,154 | B2 | 7/2009 | Elmore |
| 7,891,421 | B2 | 2/2011 | Kasevich |
| 8,196,658 | B2 | 6/2012 | Miller et al. |
| 8,371,371 | B2 | 2/2013 | Diehl et al. |
| 8,453,739 | B2 | 6/2013 | Parsche |
| 8,648,760 | B2 | 2/2014 | Parsche |
| 8,763,691 | B2 | 7/2014 | Parsche |
| 8,763,692 | B2 | 7/2014 | Parsche |
| 8,772,683 | B2 | 7/2014 | Parsche |
| 8,789,599 | B2 | 7/2014 | Parsche |
| 8,836,594 | B2 | 9/2014 | Rothwell et al. |
| 9,016,367 | B2 | 4/2015 | Wright et al. |
| 9,151,146 | B2 | 10/2015 | Rey-Bethbeder et al. |
| 9,222,343 | B2 | 12/2015 | Menard et al. |
| 9,376,899 | B2 | 6/2016 | Wright et al. |
| 9,938,809 | B2 | 4/2018 | Okoniewski et al. |
| 2008/0073079 | A1 | 3/2008 | Tranquilla et al. |
| 2011/0146968 | A1 | 6/2011 | Diehl |
| 2011/0146981 | A1 | 6/2011 | Diehl |
| 2011/0303423 | A1 | 12/2011 | Kaminsky et al. |
| 2012/0061380 | A1 | 3/2012 | Parsche |
| 2012/0118565 | A1 | 5/2012 | Trautman et al. |
| 2012/0305239 | A1 | 12/2012 | Sultenfuss et al. |
| 2012/0318498 | A1 | 12/2012 | Parsche |
| 2013/0180729 | A1 | 7/2013 | Wright et al. |
| 2013/0192825 | A1 | 8/2013 | Parsche |
| 2013/0277045 | A1 | 10/2013 | Parsche |
| 2013/0334205 | A1 | 12/2013 | Wright et al. |
| 2014/0110395 | A1 | 4/2014 | Parsche |
| 2014/0131032 | A1 | 5/2014 | Dittmer |
| 2014/0224472 | A1 | 8/2014 | Parsche |
| 2014/0262222 | A1 | 9/2014 | Wright et al. |
| 2014/0262224 | A1 | 9/2014 | Ayers et al. |
| 2014/0266951 | A1 | 9/2014 | Okoniewski et al. |
| 2014/0290934 | A1 | 10/2014 | Parsche |
| 2014/0300520 | A1 | 10/2014 | Nguyen et al. |
| 2015/0192004 | A1 | 7/2015 | Saeedfar |
| 2015/0308260 | A1* | 10/2015 | Kuckes ............... G01V 3/30 175/45 |
| 2015/0322759 | A1 | 11/2015 | Okoniewski et al. |
| 2016/0047213 | A1 | 2/2016 | Grounds, III et al. |
| 2016/0168977 | A1 | 6/2016 | Donderici et al. |
| 2017/0231035 | A1 | 8/2017 | Okoniewski et al. |
| 2019/0017360 | A1 | 1/2019 | Wheeler et al. |
| 2019/0145235 | A1 | 5/2019 | Okoniewski et al. |

FOREIGN PATENT DOCUMENTS

| | | |
|---|---|---|
| CA | 2816297 C | 5/2017 |
| CA | 2881763 C | 12/2017 |
| EP | 1779938 A2 | 5/2007 |
| WO | 2009049358 A1 | 4/2009 |
| WO | 2012067769 A2 | 5/2012 |
| WO | 2012067770 A1 | 5/2012 |
| WO | 2015128497 A1 | 9/2015 |
| WO | 2016024197 A2 | 2/2016 |
| WO | 2016024198 A2 | 2/2016 |
| WO | 2016054734 A1 | 4/2016 |
| WO | 2017177319 A1 | 10/2017 |

OTHER PUBLICATIONS

Ellison, C., Mullen, C.A. and Elkasabi, Y., 2026. Analytical and experimental study of switchgrass and agricultural plastic co-pyrolysis in a microwave reactor. Fuel, 406, p. 136771. DOI: https://doi.org/10.1016/j.fuel.2025.136771 (Year: 2025).*

Sresty et al., "Recovery of Bitumen from Tar Sand Deposits with the Radio Frequency Process," SPE 10229, Reservoir Engineering, 1986, p. 85-94.

Pauli et al., "A dielectric traveling wave antenna for microwave assisted soil remediation", Mediterranean Microwave Symposium, Budapest, Hungary, 2007.

Koolman et al., "Electromagnetic Heating Method to Improve Steam Assisted Gravity Drainage", Paper presented at the International Thermal Operations and Heavy Oil Symposium, Calgary, Alberta, Canada, Oct. 2008, pp. 1-12 <https://doi.org/10.2118/117481-MS>.

Sutinjo et al., "Radiation from Fast and Slow Traveling Waves", IEEE Antennas Propag., 2008, 50(4): 175-181.

Mario Pauli et al., "Impedance Matching of a Coaxial Antenna for Microwave In-situ Processing of Polluted Soils", retrieved from Journal of Microwave Power and Electromagnetic Energy, 45(2), 2011, pp. 70-78.

Ellison et al. (2018) Dielectric characterization of bentonite clay at various moisture contents and with mixtures of biomass in the microwave spectrum, Journal of Microwave Power and Electromagnetic Energy, 52:1, 3-15, DOI: 10.1080/08327823.2017.1421407 (Year: 2018).

Non-final Office Action and Notice of References Cited mailed Oct. 1, 2021 in U.S. Appl. No. 16/934,146 (10 pages).

Ellison et al, 2022. Comparative evaluation of microwave and conventional gasification of different coal types: Experimental reaction studies. Fuel, 321, p. 124055. DOI: https://doi.org/10.1016/j.fuel.2022.124055 (Year: 2022).

* cited by examiner

NON-EQUIDISTANT OPEN TRANSMISSION LINES FOR ELECTROMAGNETIC HEATING AND METHOD OF USE

CROSS-REFERENCE TO RELATED APPLICATION

This application is a continuation of U.S. patent application Ser. No. 16/671,864 filed on Nov. 1, 2019, which claims the benefit of U.S. Provisional Application No. 62/772,821, filed on Nov. 29, 2018. The entire contents of U.S. application Ser. No. 16/671,864 and U.S. Prov. App. No. 62/772,821 are hereby incorporated by reference for all purposes.

FIELD

The embodiments described herein relate to electromagnetically heating hydrocarbon formations, and in particular to apparatus and methods of providing transmission line conductors for systems that electromagnetically heat hydrocarbon formations.

BACKGROUND

The following is not an admission that anything discussed below is part of the prior art or part of the common general knowledge of a person skilled in the art.

Electromagnetic (EM) heating can be used for enhanced recovery of hydrocarbons from underground reservoirs. Similar to traditional steam-based technologies, the application of EM energy to heat hydrocarbon formations can reduce viscosity and mobilize bitumen and heavy oil within the hydrocarbon formation for production. Hydrocarbon formations can include heavy oil formations, oil sands, tar sands, carbonate formations, shale oil formations, and any other hydrocarbon bearing formations, or any other mineral.

EM heating of hydrocarbon formations can be achieved by using an EM radiator, or antenna, applicator, or lossy transmission line positioned inside an underground reservoir to radiate, or couple, EM energy to the hydrocarbon formation. A producer well is typically located below or at the bottom of the underground reservoir to collect the heated oil, which drains mainly by gravity.

As the hydrocarbon formation is heated, steam is also released and displaces the heated oil that has drained to and is collected in the producer well. The steam can accumulate in a steam chamber above the producer well. Direct contact between the steam chamber and the producer well can result in a drop in system pressure, which increases steam and water production but reduces oil production. It is advantageous to maintain separation between the steam chamber and the producer well for as long as possible.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

Various embodiments described herein generally relate to apparatus (and associated methods to provide the apparatus) for electromagnetic heating of an underground hydrocarbon formation. The apparatus can include an electrical power source; at least one electromagnetic wave generator for generating alternating current, the at least one electromagnetic wave generator being powered by the electrical power source; at least two transmission line conductors positioned in the hydrocarbon formation; at least one waveguide for carrying the alternating current from the at least one electromagnetic wave generator to the at least two transmission line conductors; and a producer well positioned between the at least two transmission line conductors and at a greater depth than at least one of the at least two transmission line conductors to receive heated hydrocarbons via gravity. The at least two transmission line conductors are coupled at a proximal end to the at least one electromagnetic wave generator. The at least two transmission line conductors are excitable by the alternating current to propagate a travelling wave within the hydrocarbon formation. The at least two transmission line conductors include a first transmission line conductor and a second transmission line conductor. Each of the at least one waveguide have a proximal end and a distal end. The proximal end of the at least one waveguide is connected to the at least one electromagnetic wave generator. The distal end of the at least one waveguide is connected to at least one of the at least two transmission line conductors. The producer well defines a longitudinal axis. Each of the at least two transmission line conductors extend along the longitudinal axis. At at least one reference location along the length of the longitudinal axis, the first transmission line conductor is laterally spaced from the producer well by a first reference distance and the second transmission line conductor is laterally spaced from the producer well by a second reference distance to generate an electromagnetic field having a reference shape and a reference position with respect to the longitudinal axis. At at least a second location along the length of the longitudinal axis, the first transmission line conductor is laterally spaced from the producer well by a third distance and the second transmission line conductor is laterally spaced from the producer well by a fourth distance. At least one of (i) the third distance is greater than the first reference distance, and (ii) the fourth distance is greater than the second reference distance to generate an electromagnetic field having at least one of (i) a shape that is more elongated than the reference shape, and (ii) a different position from the reference position.

In at least one embodiment, at the reference location, the first transmission line conductor and the second transmission line conductor can be laterally spaced apart by about 8 meters to about 10 meters.

In at least one embodiment, at the second location, the first transmission line conductor and the second transmission line conductor are laterally spaced apart by about 8 meters to about 40 meters.

In at least one embodiment, at a third location along the length of the longitudinal axis, the first transmission line conductor is laterally spaced from the producer well by a fifth distance and the second transmission line conductor is laterally spaced from the producer well by a sixth distance, at least one of (i) the fifth distance being less than the first reference distance, and (ii) the sixth distance being less than the second reference distance, to generate an electromagnetic field at the third location having a third shape that is less elongated than the reference shape.

In at least one embodiment, at the third location, the first transmission line conductor and the second transmission line conductor are laterally spaced apart by about 2 meters to about 8 meters.

In at least one embodiment, the third location can be located at a proximal end of the longitudinal axis for early onset of oil production.

In at least one embodiment, the third location can be located at a distal end of the longitudinal axis for increasing a final recovery factor of the apparatus.

In at least one embodiment, the producer well positioned at a greater depth than each of the at least two transmission line conductors can include the producer well positioned about 2 meters to about 10 meters deeper than each of the at least two transmission line conductors.

In at least one embodiment, a shape of at least one of the transmission line conductors and the producer well along the longitudinal axis can include at least one crest.

In at least one embodiment, the shape of at least one of the transmission line conductors along the longitudinal axis can include the at least one crest for increasing a real component of a radiation impedance of the at least two transmission line conductors and increasing a system input resistance.

In at least one embodiment, the shape of at least one of the transmission line conductors and the producer well along the longitudinal axis can include a plurality of crests.

In at least one embodiment, at least two crests of the plurality of crests can have unequal amplitudes.

In at least one embodiment, a length that each of the plurality of crests extend along the longitudinal axis can be substantially equal.

In at least one embodiment, the shape of each of the plurality of crests can be substantially identical.

In at least one embodiment, the shape of the first transmission line conductor and the shape of the second transmission line conductor each can include at least one crest.

In at least one embodiment, a first plane can be defined by the at least one crest of the first transmission line conductor having a first roll angle with respect to the producer well, and a second plane can be defined by the at least one crest of the second transmission line conductor having a second roll angle with respect to the producer well.

In at least one embodiment, a magnitude of the first roll angle can be approximately equal to a magnitude of the second roll angle.

In at least one embodiment, a first plane defined by a first crest of the plurality of crests can have a first roll angle with respect to the producer well and a second plane defined by a second crest of the plurality of crests can have a second roll angle with respect to the producer well, and a magnitude of the first roll angle can be unequal to a magnitude of the second roll angle.

In at least one embodiment, the first transmission line conductor and the second transmission line conductor can be substantially parallel.

In at least one embodiment, the shape of each of the first transmission line conductor and the second transmission line conductor can be substantially straight.

In at least one embodiment, the shape of the producer well can be substantially straight.

In at least one embodiment, the producer well and the first transmission line conductor can be substantially parallel. The producer well and the first transmission line conductor can be substantially straight. The second transmission line conductor can be substantially straight.

In at least one embodiment, the producer well and the first transmission line conductor can be substantially straight.

In at least one embodiment, the apparatus can further include a heater in the producer well.

In another broad aspect, the method can include providing electrical power to at least one electromagnetic wave generator for generating alternating current; positioning at least two transmission line conductors in the hydrocarbon formation, the at least two transmission line conductors including a first transmission line conductor and a second transmission line conductor; providing a producer well between the at least two transmission line conductors and at a greater depth than at least one of the at least two transmission line conductors to receive heated hydrocarbons via gravity; providing at least one waveguide, each of the at least one waveguide having a proximal end and a distal end; connecting the at least one proximal end of the at least one waveguide to the at least one electromagnetic wave generator; connecting the at least one distal end of the at least one waveguide to at least one of the at least two transmission line conductors; using the at least one electromagnetic wave generator to generate alternating current; and applying the alternating current to excite the at least two transmission line conductors. The producer well defines a longitudinal axis, each of the at least two transmission line conductors extending along the longitudinal axis. At at least one reference location along the length of the longitudinal axis, the first transmission line conductor is laterally spaced from the producer well by a first reference distance and the second transmission line conductor is laterally spaced from the producer well by a second reference distance. At at least a second location along the length of the longitudinal axis, the first transmission line conductor is laterally spaced from the producer well by a third distance and the second transmission line conductor is laterally spaced from the producer well by a fourth distance. At least one of the third distance is greater than the first reference distance and the fourth distance is greater than the second reference distance. The excitation of the at least two transmission line conductors is capable of propagating a travelling wave within the hydrocarbon formation and generating an electromagnetic field having a reference shape and a reference position with respect to the longitudinal axis at the at least one reference location and at least one of a second shape and a different position from the reference position at the second location, the second shape being more elongated than the reference shape.

In at least one embodiment, at a third location along the length of the longitudinal axis, the first transmission line conductor can be laterally spaced from the producer well by a third distance and the second transmission line conductor can be laterally spaced from the producer well by a fourth distance. At least one of (i) the third distance being less than the first reference distance, and (ii) the fourth distance being less than the second reference, to generate an electromagnetic field having a third shape at the third location, the third shape being less elongated than the reference shape.

In at least one embodiment, the third location can be located at a proximal end of the longitudinal axis for early onset of oil production.

In at least one embodiment, the third location can be located at a distal end of the longitudinal axis for increasing a final recovery factor of the apparatus.

In at least one embodiment, a shape of at least one of the transmission line conductors and the producer well along the longitudinal axis includes at least one crest.

In at least one embodiment, the shape of at least one of the transmission line conductors along the longitudinal axis can include the at least one crest for increasing a real component of a radiation impedance of the at least two transmission line conductors and increasing a system input resistance.

In at least one embodiment, the shape of at least one of the transmission line conductors and the producer well along the longitudinal axis can include a plurality of crests.

In at least one embodiment, at least two crests of the plurality of crests can have unequal amplitudes.

In at least one embodiment, a length that each of the plurality of crests extend along the longitudinal axis can be substantially equal.

In at least one embodiment, the shape of each of the plurality of crests can be substantially identical.

In at least one embodiment, the shape of the first transmission line conductor and the shape of the second transmission line conductor each can include at least one crest.

In at least one embodiment, a first plane can be defined by the at least one crest of the first transmission line conductor having a first roll angle with respect to the producer well and a second plane can be defined by the at least one crest of the second transmission line conductor having a second roll angle with respect to the producer well.

In at least one embodiment, a magnitude of the first roll angle can be approximately equal to a magnitude of the second roll angle.

In at least one embodiment, a first plane defined by a first crest of the plurality of crests can have a first roll angle with respect to the producer well and a second plane defined by a second crest of the plurality of crests can have a second roll angle with respect to the producer well, and a magnitude of the first roll angle can be unequal to a magnitude of the second roll angle.

It will be appreciated by a person skilled in the art that an apparatus or method disclosed herein may embody any one or more of the features contained herein and that the features may be used in any particular combination or sub-combination. Further aspects, features and advantages of the various embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

Figure 1:
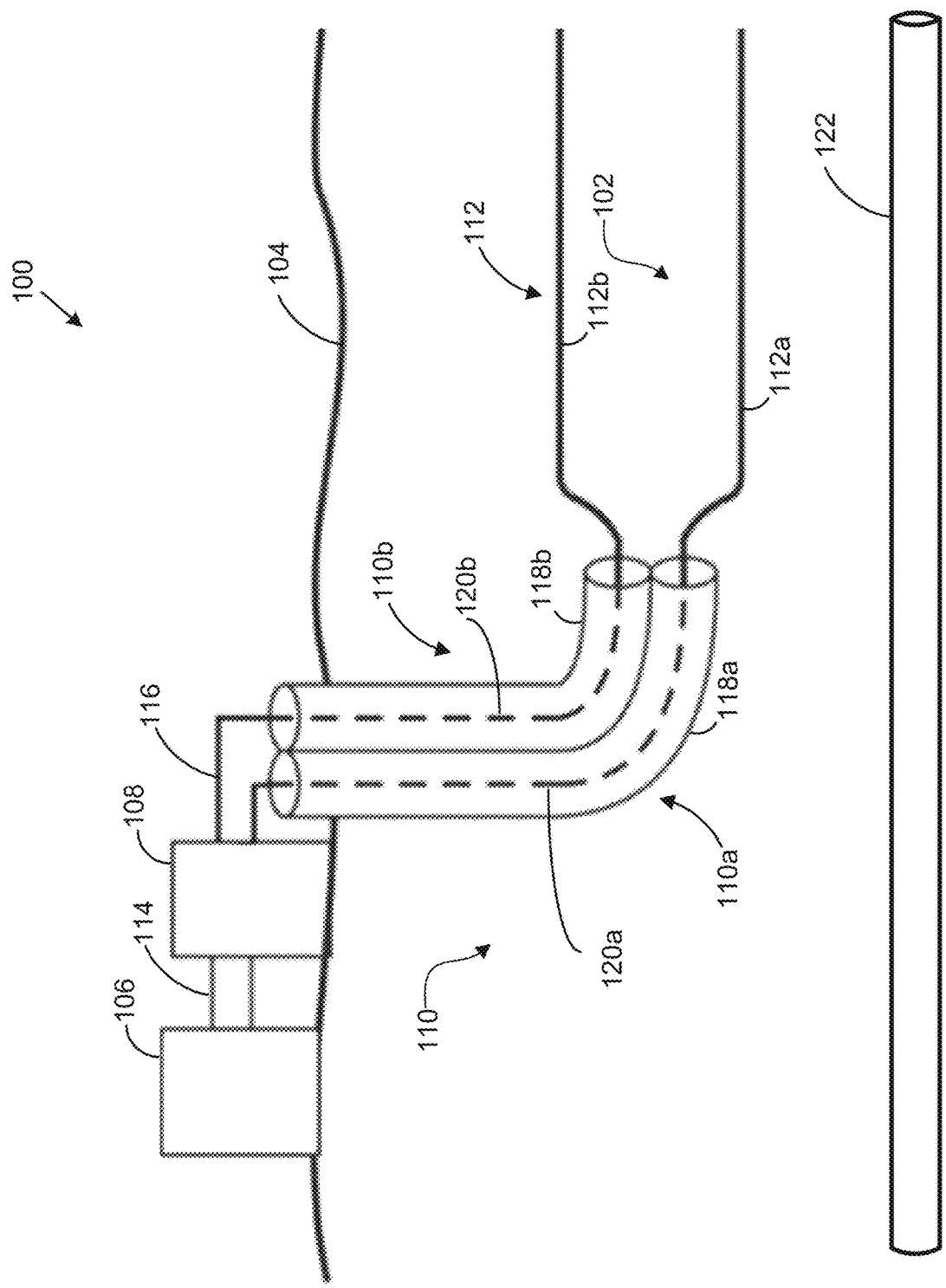
FIG. 1 is profile view of an apparatus for electromagnetic heating of formations according to at least one embodiment.

The drawings, described below, are for illustration purposes only. The drawings are not intended to limit the scope of the applicants' teachings in any way. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly connected to one another or connected to one another through one or more intermediate elements.

The term radio frequency when used herein is intended to extend beyond the conventional meaning of radio frequency. The term radio frequency is considered here to include frequencies at which physical dimensions of system components are comparable to the wavelength of the EM wave. System components that are less than approximately 10 wavelengths in length can be considered comparable to the wavelength. For example, a 1 kilometer (km) long underground system that uses EM energy to heat underground formations and operates at 50 kilohertz (kHz) will have physical dimensions that are comparable to the wavelength. If the underground formation has significant water content, (e.g., relative electrical permittivity being approximately 60 and conductivity being approximately 0.002 S/m), the EM wavelength at 50 kHz is 303 meters. The length of the 1 km long radiator is approximately 3.3 wavelengths. If the underground formation is dry (e.g., relative electrical permittivity being approximately 6 and conductivity being approximately 3E−7 S/m), the EM wavelength at 50 kHz is 2450 meters. The length of the radiator is then approximately 0.4 wavelengths. Therefore in both wet and dry scenarios, the length of the radiator is comparable to the wavelength. Accordingly, effects typically seen in conventional RF systems will be present and while 50 kHz is not typically considered RF frequency, this system is considered to be an RF system.

Referring to FIG. 1, shown therein is a profile view of an example apparatus 100 for electromagnetic heating of hydrocarbon formations. The apparatus 100 can be used for electromagnetic heating of a hydrocarbon formation 102. As illustrated, the apparatus 100 includes an electrical power source 106, an electromagnetic (EM) wave generator 108, a waveguide portion 110, and transmission line conductor portion 112. It will be appreciated that the configuration of the apparatus 100 shown in FIG. 1 is provided for illustration purposes only and other configurations are possible.

As shown in FIG. 1, the electrical power source 106 and the electromagnetic wave generator 108 can be located at the surface 104. Alternately, one or both of the electrical power source 106 and the electromagnetic wave generator 108 can be located below ground.

The electrical power source 106 can generate electrical power. The electrical power source 106 can be any appropriate source of electrical power, such as a stand-alone electric generator or an electrical grid. The electrical power may be one of alternating current (AC) or direct current (DC). Power cables 114 carry the electrical power from the electrical power source 106 to the EM wave generator 108.

The EM wave generator 108 can generate EM power. The EM power can be high frequency alternating current, alternating voltage, current waves, or voltage waves. The EM power can be a periodic high frequency signal having a fundamental frequency ($f_0$). The high frequency signal can have a sinusoidal waveform, square waveform, or any other appropriate shape. The high frequency signal can further include harmonics of the fundamental frequency. For example, the high frequency signal can include second harmonic $2f_0$, and third harmonic $3f_0$ of the fundamental frequency $f_0$.

Optionally, the EM wave generator 108 can produce more than one frequency at a time. Optionally, the frequency and shape of the high frequency signal may change over time. The term "high frequency alternating current", as used herein, broadly refers to a periodic, high frequency EM power signal. In some cases, the periodic, high frequency EM power signal can be a voltage signal.

As noted above, the EM wave generator 108 can be located underground. An apparatus with the EM wave generator 108 located above ground rather than underground can be easier to deploy. However, when the EM wave generator 108 is located underground, transmission losses are reduced because EM energy is not dissipated in areas that do not produce hydrocarbons (i.e., distance between the EM wave generator 108 and the transmission line conductor portion 112).

The waveguide portion 110 can carry high frequency alternating current from the EM wave generator 108 to the transmission line conductors 112a and 112b. Each of the transmission line conductors 112a and 112b can be coupled to the EM wave generator 108 via individual waveguides 110a and 110b. As shown in FIG. 1, the waveguides 110a and 110b can be collectively referred to as the waveguide portion 110. Each of the waveguides 110a and 110b can have a proximal end and a distal end. The proximal ends of the waveguides can be connected to the EM wave generator 108. The distal ends of the waveguides 110a and 110b can be connected to the transmission line conductors 112a and 112b.

Each waveguide 110a and 110b can be provided by a coaxial transmission line having an outer conductor 118a and 118b and an inner conductor 120a and 120b, respectively. For example, each of the waveguides 110a and 110b can be provided by a metal casing pipe as the outer conductor. The metal casings may concentrically surround the inner conductors. The inner conductors can be provided using pipes, cables, wires, or conductor rods, for example. Optionally, the outer conductors 118a and 118b can be positioned within at least one additional casing pipe along at least part of the length of the waveguide portion 110.

The transmission line conductor portion 112 can be coupled to the EM wave generator 108 via the waveguide portion 110. As shown in FIG. 1, the transmission line conductors 112a and 112b may be collectively referred to as the transmission line conductor portion 112. Optionally, additional transmission line conductors 112 may be included, i.e. the apparatus may include more than two transmission line conductors.

In some examples, each of the transmission line conductors 112a and 112b can be defined by a pipe. Alternately, only one or none of the transmission line conductors may be defined by a pipe. The transmission line conductors 112a and 112b may be conductor rods, coiled tubing, or coaxial cables, or any other pipe to transmit EM energy from EM wave generator 108.

The transmission line conductors 112a and 112b have a proximal end and a distal end. The proximal end of the transmission line conductors 112a and 112b can be coupled to the EM wave generator 108, via the waveguide portion 110. The transmission line conductors 112a and 112b can be excited by the high frequency alternating current generated by the EM wave generator 108. When excited, the transmission line conductors 112a and 112b can form an open transmission line between transmission line conductors 112a and 112b. The open transmission line can carry EM energy in a cross-section of a radius comparable to a wavelength of the excitation. The open transmission line can propagate an EM wave from the proximal end of the transmission line conductors 112a and 112b to the distal end of the transmission line conductors 112a and 112b.

The EM wave may propagate as a standing wave. Alternately, the electromagnetic wave may propagate as a partially standing wave. Alternately, the electromagnetic wave may propagate as a travelling wave.

The hydrocarbon formation 102 between the transmission line conductors 112a and 112b can act as a dielectric medium for the open transmission line. The open transmission line can carry and dissipate energy within the dielectric medium, that is, the hydrocarbon formation 102. The open transmission line formed by transmission line conductors and carrying EM energy within the hydrocarbon formation 102 can be considered a "dynamic transmission line". By propagating an EM wave from the proximal end of the transmission line conductors 112a and 112b to the distal end of the transmission line conductors 112a and 112b, the dynamic transmission line can carry EM energy within long well bores. Wellbores spanning a length of 500 meters (m) to 1500 meters (m) can be considered long.

Producer well 122 is located at or near the bottom of the underground reservoir to receive heated oil released from the hydrocarbon formation 102 by the EM heating process. The heated oil drains mainly by gravity to the producer well 122. As shown in FIG. 1, producer well 122 is substantially horizontal (i.e., parallel to the surface). Producer well 122, or a vertical projection of the producer well 122, can define a longitudinal axis along which the transmission line conductors 112a and 112b extend.

The producer well 122 may be located at the same depth or at a greater depth than at least one of the transmission line conductors 112a, 112b of the open transmission line 112. Alternately, the producer well 122 can be located above the transmission line conductors 112a, 112b of the open transmission line 112.

The producer well 122 may be positioned in between the transmission line conductors 112a, 112b. For example, the producer well 122 may be centered between the transmission line conductors 112a, 112b. Alternately, the producer well 122 may be positioned with any appropriate offset from a center of the transmission line conductors 112a, 112b. In some applications, it can be advantageous to have the producer well closer to a first transmission line conductors than a second transmission line conductor. This may allow the region closer to the first transmission line conductor to be heated faster, contributing to early onset of oil production.

As the hydrocarbon formation 102 is heated, steam is also released and displaces the heated oil that has drained to and is collected in the producer well 122. The steam can accumulate in a steam chamber above the producer well 122. Direct contact between the steam chamber and the producer well 122 can result in a drop in system pressure, which increases steam and water production but reduces oil production. Thus, it is advantageous to maintain separation between the steam chamber and the producer well 122 for as long as possible.

The open transmission line is well suited to produce wide and flat heated areas. The width of the heated area can be varied by adjusting the separation between the transmission line conductors 112a and 112b. However, the hydrocarbon formation 102 between the transmission line conductors 112a and 112b may not be heated uniformly until the whole hydrocarbon formation 102 between the transmission line conductors 112a and 112b is desiccated. Regions closer to the transmission line conductors 112a and 112b may initially be heated much more strongly than the regions further from the transmission line conductors 112a and 112b, including the region between the transmission line conductors 112a and 112b.

In some applications, it can be advantageous for the distance between the transmission line conductors 112a and 112b to be narrow to encourage early onset of oil production. However, a wider distance (e.g. larger than 8 meters) between the transmission line conductors 112a and 112b may encourage a better recovery factor, particularly for long term oil production, by maintaining a separation between the producer well 122 and the steam chamber (i.e., maintaining a disconnected steam chamber). The wider distance can also promote a deeper penetration of the EM wave into the formation 102.

In some cases, the distance between the transmission line conductors 112a and 112b can be narrow during a first stage (e.g., several years) of the heating process to encourage early onset of oil production. During a second stage of the heating process, the distance between the transmission line conductors 112a and 112b can be wider to continue to drive oil production.

The distance between the transmission lines can vary in order to achieve various production goals. For example, the distance between the transmission line conductors 112a and 112b can be narrow in a first region of the formation 102 the distance between the transmission line conductors 112a and 112b can be wider in a second region of the formation 102. This may encourage early onset of oil product in the first region while encouraging continued oil product in the second region by reaching further away into the formation and maintaining a separation between the producer well 122 and the steam chamber (i.e., maintaining a disconnected steam chamber).

Underground reservoir simulations indicate that heating a wide, flat and uniform area approximately 2 meters to 8 meters above the producer well 122 can create a steam chamber that is more favorable than when the heated area is narrow, even if the total EM power used for heating is the same. A distance of approximately 8 meters to 40 meters can be considered wide. In contrast, a distance of approximately less than 8 meters can be considered narrow. A more favorable steam chamber is a chamber which stays 'disconnected' (i.e., remains separated) from the producer well 122 for a longer period of time.

It is also preferable to produce as much as economically viable from the underground reservoir. This can be achieved by producing heat laterally far from the open transmission line, while minimizing heating of the under-burden (i.e., region below the underground reservoir) and/or over-burden layers (i.e., region above the underground reservoir). Heating of the under-burden and/or over-burden does not generally result in oil production, and therefore represents radiation losses.

Figure 2:
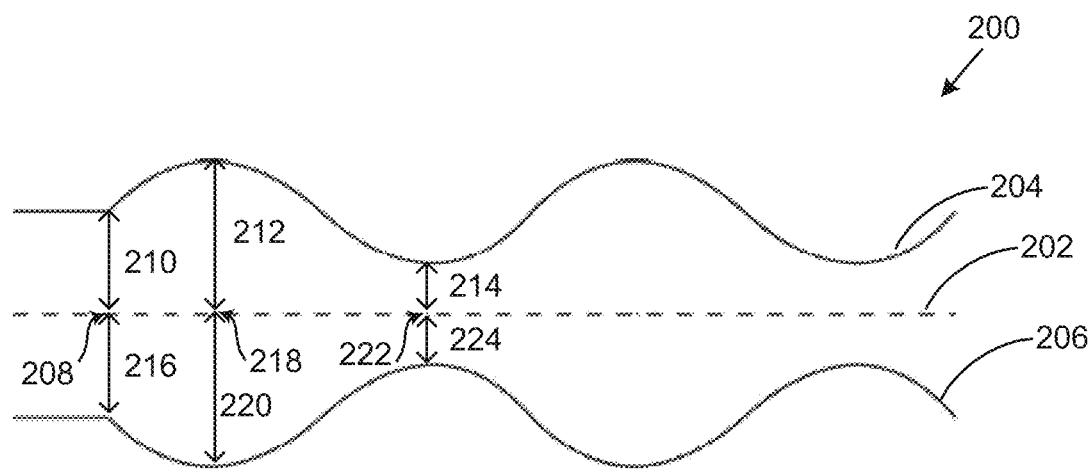
FIG. 2 is a schematic top view of a non-equidistant open transmission line, in accordance with at least one embodiment.

Referring to FIG. 2, shown therein is a schematic top view of a non-equidistant open transmission line, according to at least one embodiment. The open transmission line 200 includes a first transmission line conductor 204 and a second transmission line conductor 206. Also shown in FIG. 2 is producer well 202.

As shown in FIG. 2, at a location 208 along the length of the longitudinal axis, the first transmission line conductor 204 is laterally spaced from the producer well 202 by a first reference distance 210 and the second transmission line conductor 206 is laterally spaced from the producer well 202 by a second reference distance 216 to generate an electromagnetic field having a reference shape and a reference position with respect to the longitudinal axis.

Although the first reference distance 210 and second reference distance 216 are only indicated at location 208 in FIG. 2, the first transmission line conductor 204 and the second transmission line conductor 206 are laterally spaced from the producer well 202 by the first reference distance 210 and the second reference distance 216, respectively, at multiple locations along the length of the longitudinal axis. Furthermore, the additional locations at which the first transmission line conductor 206 and the second transmission line conductor 206 are laterally spaced from the producer well 202 by the first reference distance 210 and the second reference distance 216, respectively, can occur at different locations along the length of the longitudinal axis. As shown in FIG. 2, the second reference distance 216 is equal to the first reference distance 210. Alternately, the second reference distance 216 can be unequal to the first reference distance 210. For example, the first transmission line conductor 204 and the second transmission line conductor 206 can be laterally spaced apart by about 8 meters to about 10 meters at location 208.

As shown in FIG. 2, in addition to the location 208, the first transmission line conductor 204 and the second transmission line conductor 206 are laterally spaced apart by various distances at various locations along the length of the longitudinal axis. In particular, at location 218, the first transmission line conductor 204 is laterally spaced from the producer well 202 by a third distance 212 and the second transmission line conductor 206 is laterally spaced from the producer well 202 by a fourth distance 220.

Also shown in the example of FIG. 2, the third distance 212 and the first reference distance 212 are unequal. As well, the fourth distance 220 and the second reference distance 216 are unequal. At least one of the third distance 212 and the fourth distance 220 is greater than the first reference distance 210 and the second reference distance 216, respectively, to generate an electromagnetic field having a more elongated shape than the reference shape. That is, either (i) the third distance 212 is greater than the first reference distance 210, (ii) the fourth distance 220 is greater than the second reference distance 216, or (iii) both the third distance 212 is greater than the first reference distance 210 and the fourth distance 220 is greater than the second reference distance 216, to generate an electromagnetic field having a more elongated shape than the reference shape.

In some embodiments, the first transmission line conductor 204 and the second transmission line conductor 206 can be laterally spaced apart by about 8 meters to about 40 meters at location 218. Although the third distance 212 and the fourth distance 220 are only indicated at location 218 in FIG. 2, the first transmission line conductor 204 and the second transmission line conductor 206 are laterally spaced from the producer well 202 by the third distance 212 and the fourth distance 220, respectively, at multiple locations along the length of the longitudinal axis. Furthermore, the additional locations at which the first transmission line conductor 206 and the second transmission line conductor 206 are laterally spaced from the producer well 202 by the third distance 212 and the fourth distance 220 respectively can occur at different locations along the length of the longitudinal axis. As well, at multiple locations along the length of the longitudinal axis, the distance between the first transmission line conductor 204 and the producer well 202 is greater than the first reference distance 210 and/or the distance between the second transmission line conductor 206 and the producer well 220 is greater than the second reference distance 216.

The transition of the electromagnetic field between the reference shape and the more elongated shape can result in stronger longitudinal electric field components with respect to the orientation of the producer well 202 than the electromagnetic field of the reference shape alone. That is, an equidistant open transmission line (i.e., the first and second transmission line conductors 204, 206 being laterally spaced apart from the producer well 202 by a substantially uniform distance along the longitudinal axis) generates an electromagnetic field of the reference shape along the length of the longitudinal axis only. The electromagnetic field of the reference shape includes only radial electric field components between the first and second transmission line conductors 204, 206 (i.e., electric field components perpendicular to the longitudinal axis). However, a non-equidistant open transmission line (i.e., at least one of the first and second transmission line conductors 204, 206 are laterally spaced apart from the producer well 202 by unequal distances along the length of the longitudinal axis) generates an electromagnetic field that transitions between the reference shape and a more elongated shape, and as a result, includes longitudinal electric field components between the first and second transmission line conductors 204, 206 (i.e., electric field components non-perpendicular to the longitudinal axis). By including longitudinal components, the non-equidistant open transmission line 200 can result in better lateral penetration of the electromagnetic field into the hydrocarbon formation 102 than an equidistant transmission line conductor. FIG. 1 is an example of an equidistant open transmission line, in which the transmission line conductors 112a, 112b are generally straight and the distance between the transmission line conductors 112a, 112b and the producer well 122 is substantially uniform, or constant along the length of the longitudinal axis.

Better lateral penetration into the hydrocarbon formation 102 can result in increased oil production, by heating and releasing oil that would otherwise not be produced by the equidistant open transmission line. Furthermore, the electromagnetic field having a more elongated shape than the reference shape can result in heating a wider and flatter region, thereby delaying connection of the steam chamber with the producer well 122, which can allow for a longer rate of economical oil production than that of the equidistant open transmission line.

As shown in FIG. 2, at location 222 along the length of the longitudinal axis, the first transmission line conductor 204 is also laterally spaced from the producer well 202 by a fifth distance 214 and the second transmission line conductor 206 is also laterally spaced from the producer well 202 by a sixth distance 224. The fifth distance 214 and the sixth distance 224 are also unequal to the first reference distance 210 and the second reference distance 220, respectively. Optionally, at least one of the fifth distance 214 and the sixth distance 224 can be less than the first reference distance 210 and the second reference distance 216, respectively. In such embodiments, the first transmission line conductor 204 and the second transmission line conductor 206 can be laterally spaced apart by about 2 meters to about 8 meters at location 222.

When at least one of the fifth distance 214 and the sixth distance 224 are less than the first reference distance 210 and the second reference distance 220 respectively, the electromagnetic field at location 222 has a less elongated shape than the reference shape. That is, either (i) the fifth distance 214 is less than the first reference distance 210, (ii) the sixth distance 224 is less than the second reference distance 216, or (iii) both the fifth distance 214 is less than the first reference distance 210 and the sixth distance 224 is less than the second reference distance 220 to generate an electromagnetic field having a less elongated shape than the reference shape.

Although the fifth distance 214 and the sixth distance 224 are only indicated at location 222 in FIG. 2, the first transmission line conductor 204 and the second transmission line conductor 206 are laterally spaced from the producer well 202 by the fifth distance 214 and the sixth distance 224, respectively, at multiple locations along the length of the longitudinal axis, as shown in FIG. 2. Furthermore, the additional locations at which the first transmission line conductor 204 and the second transmission line conductor 206 are laterally spaced from the producer well 202 by the fifth distance 214 and the sixth distance 224 respectively can occur at different locations along the length of the longitudinal axis. As well, at multiple locations along the length of the longitudinal axis, the distance between the first transmission line conductor 204 and the producer well 202 is less than the first reference distance 210 or the distance between the second transmission line conductor 206 and the producer well 220 is less than the second reference distance 216.

The electromagnetic field at location 222 having a less elongated shape than the reference shape can result in stronger heating of regions close to the producer well 202.

Heating regions close to the producer well 202 can be desirable to help establish early liquid communication for hydrocarbons to reach the producer well 202.

The first transmission line conductor 204 and the second transmission line conductor 206 may generate an electromagnetic field having the less elongated shape than the reference shape at a proximal end of the longitudinal axis for early onset of oil production. Alternately or in addition, the first transmission line conductor 204 and the second transmission line conductor 206 generate an electromagnetic field having the less elongated shape than the reference shape a distal end of the longitudinal axis for optimizing the electromagnetic field distribution and increasing a final recovery factor of the system. The less elongated shape can be located at both the proximal end of the longitudinal axis for early onset of oil production and at the distal end of the longitudinal axis for increasing the final recovery factor of the system.

FIG. 2 is provided for illustration purposes only and other configurations are possible. For example, the open transmission line 200 can include any number of additional transmission line conductors. In addition, although the first transmission line conductor 204 and the second transmission line conductor are shown as being laterally spaced from the producer well 202 by the first reference distance 210 and the second reference distance 216, respectively, at a plurality of locations, the first transmission line conductor 204 and the second transmission line conductor 206 can be laterally spaced the first reference distance 210 and the second reference distance 216 from the producer well 202, respectively, at only one location along the length of the longitudinal axis.

In the example illustrated, the first transmission line conductor 204 and the second transmission line conductor 206 are shown as being symmetrical about the producer well 202. That is, the distance between each of the first transmission line 204 and the second transmission line 206 to the producer well 202 are equal at all locations along the longitudinal axis. At 208, the first reference distance 210 is equal with the second reference distance 216. As well, at 218, the third distance 212 is equal with the fourth distance 220; and, at 218, the fifth distance 214 is equal with the sixth distance 224.

As shown in FIG. 2, the first and second transmission line conductors 204, 206 have a substantially non-linear shape along the length of the longitudinal axis. More specifically, each of the first and second transmission line conductors 204, 206 have a waveform-like shape along the longitudinal axis, forming at least one crest. The shape of the first transmission line conductor 204 and/or the second transmission line conductor 206 can be configured to form any number of crests. For example, the shape of the first transmission line conductor 204 and/or the second transmission line conductor 206 can be configured to form a plurality of crests. The shape of a transmission line conductor forming a plurality of crests can be referred to as undulating. Alternately, the shape of a transmission line conductor may form only one crest. Such a transmission line conductor can be configured with a V-shape or an inverted V-shape.

In the example illustrated in FIG. 2, the first and second transmission line conductors 204, 206 have the same number. Alternately, the first and second transmission line conductors 204, 206 can have a different number of crests. Alternately or in addition, only one of the first and second transmission line conductors may have a crest and the other transmission line conductor can be straight.

In the example illustrated in FIG. 2, the crests of the first and second transmission line conductors 204, 206 have the same amplitude. Alternately, the amplitude of the crests can differ within a transmission line conductor and/or between the first and second transmission line conductors 204, 206.

In the example illustrated in FIG. 2, the crests of the first and second transmission line conductors 204, 206 have the same period. That is, the length that each crest extends along the longitudinal axis is substantially equal and each of the first and second transmission line conductors 204, 206 are periodic. Alternately, the period of the crests can differ within a transmission line conductor and/or between the first and second transmission line conductors 204, 206. For example, a first crest can extend twice the length along the longitudinal axis as a second crest. That is, a transmission line conductor can be aperiodic.

In the example illustrated in FIG. 2, the crests of the first and second transmission line conductors 204, 206 have a sinusoidal shape. Alternately, the crests can have any shape that traverses between a maximum point and a minimum point. For example, a crest can have a saw tooth shape, a triangular shape, a square shape, or a helical shape. In practice, available shapes may be limited by the capabilities of drilling or boring technology. For example, current drilling technology is limited to directional change of approximately less than 15 degrees per 100 feet. However, as drilling technology advances, more rapid directional changes may become available.

Optionally, the shape of the crests can differ within a transmission line conductor and/or between the first and second transmission line conductors 204, 206. For example, a first crest of a first transmission line conductor 204 can have a saw tooth shape and a second crest of the first transmission line conductor 204 can have a triangular shape, and a third crest of the second transmission line conductor 206 can have a sinusoidal shape. Alternately, the crests of the first and second transmission line conductors 204, 206 may have identical shapes, such as the identical sinusoidal shapes shown in the example of FIG. 2.

An undulating transmission line conductor extending along a given length of the longitudinal axis has a greater total length than a linear, or straight transmission line conductor extending along the same length of the longitudinal axis. As a result, when the same RF power is applied to an undulating transmission line conductor and a straight transmission line conductor, the RF power applied per unit length of the undulating transmission line conductor is less than the RF power applied per unit length of the straight transmission line conductor. By reducing the RF power applied per unit length of the transmission line conductor, the undulating transmission line conductor is less susceptible to forming hot spots, in which the transmission line overheats in local areas.

The greater total length of the undulating transmission line conductor for a given length of the longitudinal axis also results in an increase in a system input resistance compared to that of a straight transmission line conductor for the same length along the longitudinal axis. The system input resistance is generally the real component of a system input impedance seen at the input terminals of the transmission line conductor by the EM wave generator 108. That is, the system input resistance is the system input impedance in a low frequency range, or the frequency range where a reactance component of a system input impedance is zero or substantially near zero.

The greater total length of the undulating transmission line conductor for a given length of the longitudinal axis also results in an increase in the real component of a radiation impedance compared to that of a straight transmission line conductor for the same length along the longitudinal axis. The radiation impedance relates to the impedance to the RF power being radiated into the formation and away from the terminated lossy transmission line.

Optionally, a heater can also be provided in the producer well 202. The heater may be provided in addition to generating electromagnetic fields having a less elongated shape at the proximal end and the distal end of the transmission line to further improve the early onset of oil production and increase the final recovery factor of the system.

Figure 3:
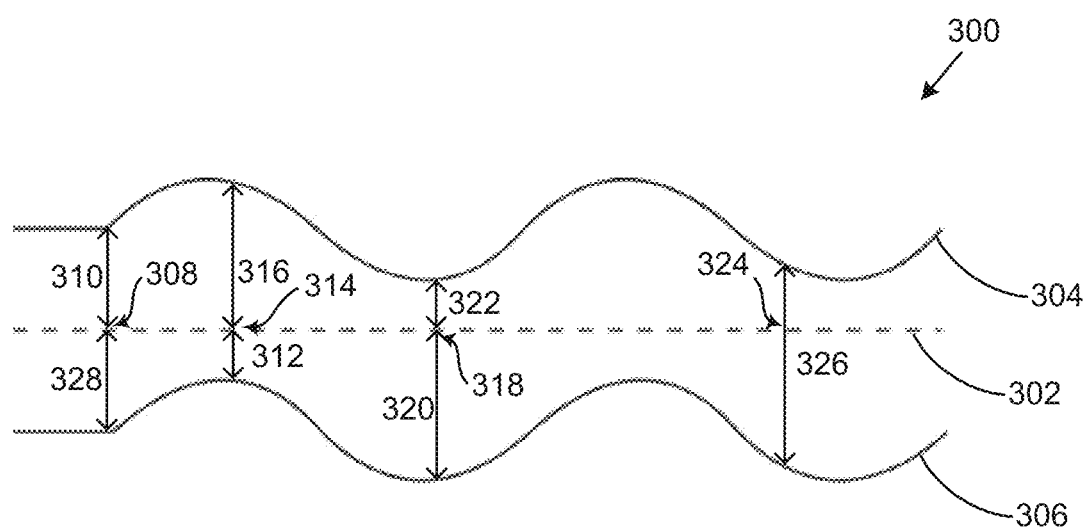
FIG. 3 is a schematic top view of another non-equidistant open transmission line, in accordance with at least one embodiment.

Referring to FIG. 3, shown therein is a schematic top view of an example non-equidistant open transmission line. The open transmission line 300 includes a first transmission line conductor 304 and a second transmission line conductor 306. Also shown in FIG. 3 is producer well 302. As shown in FIG. 3, each of the first transmission line conductor 304 and the second transmission line conductor 306 are undulating while the producer well is straight.

At a location along the length of the longitudinal axis, the first transmission line conductor 304 is laterally spaced from the producer well 302 by a first reference distance 310 and the second transmission line conductor 306 is laterally spaced from the producer well 302 by a second reference distance 328 to generate an electromagnetic field having a reference shape and a reference position with respect to the longitudinal axis.

The first transmission line conductor 304 and the second transmission line conductor 306 are laterally spaced from the producer well 302 by various distances at various locations along the length of the longitudinal axis. In particular, the first transmission line conductor 304 is laterally spaced a third distance 316 at location 314 and a fifth distance 322 at location 318 and the second transmission line conductor 306 is laterally spaced a fourth distance 312 at location 314 and a sixth distance 320 at location 318. As can been seen in FIG. 3, the third distance 316 and the fifth distance 322 are unequal with the first reference distance 310. As well, the fourth distance 312 and the sixth distance 320 are unequal with the second reference distance 328.

While the third distance 316 is greater than the first reference distance 310, the fourth distance 312 is less than the second reference distance 328 by the same magnitude at location 314. As well, while the sixth distance 320 is greater than the second reference distance 328, the fifth distance 322 is less than the first reference distance 310 by the same magnitude at location 318. That is, the distance between the first transmission line conductor 304 and the second transmission line conductor 306 is the same at locations 308, 314, and 318. Accordingly, the open transmission line 300 generates an electromagnetic field having the reference shape at locations 308, 314, and 318.

However, the position of the electromagnetic field relative to the longitudinal axis is different at locations 314 and 318 than the reference position of the electromagnetic field relative to the longitudinal axis at location 308. As a result, the electromagnetic field at locations 314 and 318 includes longitudinal electric field components between the first and second transmission line conductors 304, 306 (i.e., electric field components non-perpendicular to the longitudinal axis), similar to how the non-equidistant open transmission line 200 includes longitudinal electric field components between the first and second transmission line conductors 204, 206. By including longitudinal components, the non-equidistant open transmission line 300 can result in better lateral penetration of the electromagnetic field into the hydrocarbon formation 102 than an equidistant transmission line conductor. As noted above, better lateral penetration into the hydrocarbon formation 102 can result in increased oil production, by heating and releasing oil that would otherwise not be produced by the equidistant open transmission line.

Furthermore, varying the position of the electromagnetic field can result in heating a wider region, thereby delaying connection of the steam chamber with the producer well 122, which can allow for a longer rate of economical oil production than that of the equidistant open transmission line.

As described above, an undulating transmission line conductor extending along a given length of the longitudinal axis has a greater total length. As a result, the RF power applied per unit length of the undulating transmission line conductors 304, 306 is lower, and the non-equidistant open transmission line 300 is less susceptible to forming hot spots. In addition, the greater total length results in an increase in a system input resistance and the real component of a radiation impedance.

As shown in FIG. 3, the first transmission line conductor 304 and the second transmission line conductor 306 are substantially parallel. That is, the distance between the first transmission line conductor 304 and the second transmission line conductor 306 is substantially the same at all locations along the length of the longitudinal axis. For example, the sum of third distance 316 and the fourth distance 312 at a location 314 is substantially the same as the distance 326 between the first and second transmission line conductors 304, 306 at a second location 324. The distance 326 is also equal to the sum of the fifth distance 322 and the sixth distance 320 at a location 318. The distance 326 is also equal to the sum of the first reference distance 310 and the second reference distance 328.

The parallel first and second transmission line conductors 304, 306 of FIG. 3 can be contrasted with the symmetrical first and second transmission line conductors 204, 206 of FIG. 2. In FIG. 2, the distance between the first transmission line conductor 204 and the producer well 202 is equal to the distance between the second transmission line conductor 206 and the producer well 202 at any location along the longitudinal axis. As shown in FIG. 3, at location 314 along the longitudinal axis, the third distance 316 is greater than the fourth distance 312 and at location 318 along the longitudinal axis, the fifth distance 322 is less than the sixth distance 320. Thus, the first and second transmission line conductors 304, 306 of FIG. 3 are asymmetrical with respect to the producer well 302.

The asymmetry of the non-equidistant open transmission line 300 induces currents on the producer well 302. The currents on each of the first and second transmission line conductors 304, 306 flow in opposite directions and as a result, generate two magnetic fields of opposite sign. When the distance between the first transmission line conductor 304 and the producer well 302 is equal to the distance between the second transmission line conductor 306 and the producer well 302, the two magnetic fields cancel each other at the location of the producer well 302. However, when the producer well 302 is closer to one of the transmission line conductors 304, 306 than the other transmission line conductor, the magnetic field generated by the closer transmission line conductor is stronger at the location of the producer well 302 than the magnetic field generated by the further transmission line conductor. Therefore, a non-zero magnetic field occurs at the location of the producer well 302 and induces current on the producer well 302. Currents on the producer well 302 help establish early liquid communication for hydrocarbons to reach the producer well 302.

Referring to FIG. 4, shown therein is a cross-sectional view 400 of the non-equidistant open transmission line 200 of FIG. 2. As shown in FIG. 4, the producer well 202 is located at a greater depth 408 than the first and second transmission line conductors 204, 206. More specifically, the producer well 202 is located at a greater depth 408 than a greatest depth 402 of the first and second transmission line conductors. In some embodiments, the producer well 202 can be positioned about 2 meters to about 10 meters deeper than the first and second transmission line conductors. That is, the distance 408 can be about 2 meters to about 10 meters.

Since the producer well is located at a greater depth 408 than the greatest depth 402 of the first and second transmission lines, distances 212, 214 relates to distances between the first transmission line conductor 204 and a vertical projection of the producer well 202.

The shape of each of the first and second transmission line conductors, that is, the crest extending between a maximum point and a minimum point can define a plane. A cross-sectional view of the plane, is indicated by lines 204 representing the transmission line conductors 204, 206 in FIG. 4A. Furthermore, using a pitch, yaw, and roll coordinate system, each plane can have a roll angle with respect to the producer well 202, and more specifically, a roll angle with respect to a horizontal projection 402 of the producer well 202. The roll angle of each transmission line conductor can be any angle between −90° to +90°. At a roll angle of ±90°, the transmission line conductors, that is, a plane defined by the shape of the transmission line conductors, can be approximately vertical.

Figure 4A:
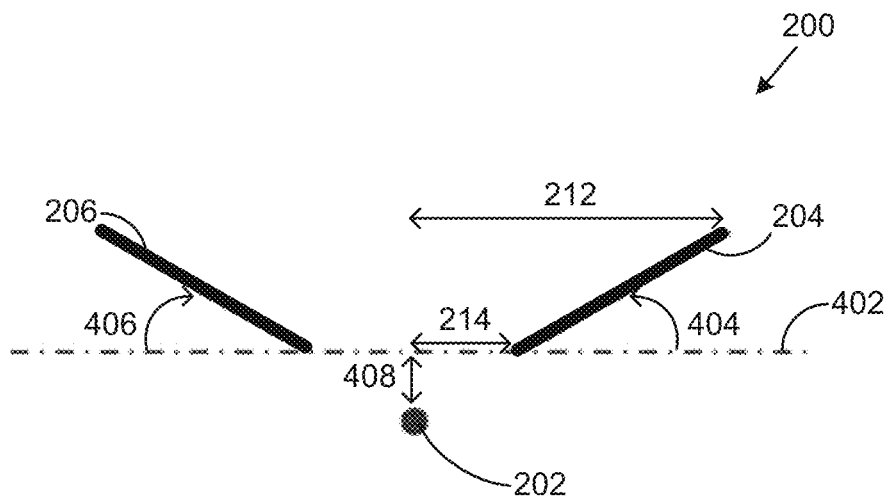
FIG. 4A is a schematic cross-sectional view of a non-equidistant open transmission line, in accordance with at least one embodiment.

For example, the first transmission line conductor 204 is positioned having a roll angle 404 with respect to the producer well 202 and the second transmission line conductor 206 is positioned having a roll angle 406 with respect to the producer well. In FIG. 4A, the magnitude of the roll angle of the first transmission line conductor 204 is approximately equal to the magnitude of the roll angle of the second transmission line conductor 206. In some embodiments, the magnitudes of the roll angle of the first and second transmission line conductors 204, 206 are unequal. In FIG. 4A, the directions of the roll angle of the first and second transmission line conductors 204, 206 are opposite. In some embodiments, the directions of the roll angle of the first and second transmission line conductors 204, 206 are the same.

The shape of a transmission line conductor may define a plurality of planes. For example, a transmission line conductor can include a plurality of crests including at least a first crest and a second crest. The first crest can define a first plane having a first roll angle with respect to the producer well and the second crest can define a second plane having a second roll angle with respect to the producer well, and a magnitude of the first roll angle can be unequal to a magnitude of the second roll angle.

Figure 4B:
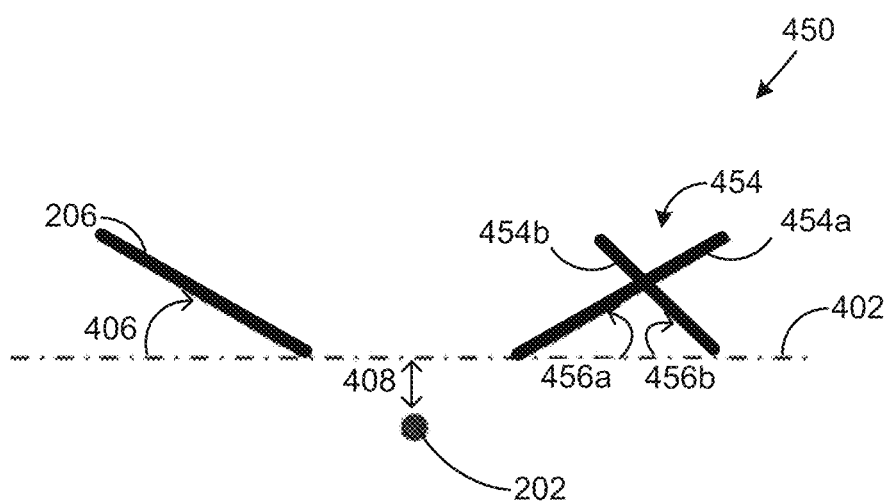
FIG. 4B is a schematic cross-sectional view of a non-equidistant open transmission line, in accordance with at least one embodiment.

Referring to FIG. 4B, shown therein is a cross-sectional view 450 of an example non-equidistant open transmission line. Similar to FIG. 4A, the producer well 202 is located at a greater depth 408 than a greatest depth 402 of the first and second transmission line conductors 454, 206.

The first transmission line conductor 454 includes at least a first crest 454a that defines a first plane and at least a second crest 454b that defines a second plane. The first plane has a roll angle 456a with respect to the producer well 202 and the second plane has a roll angle 456b with respect to the producer well 202. As shown in FIG. 4B, the magnitude of the first roll angle 456a is unequal to the magnitude of the second roll angle 456b.

Figure 5:
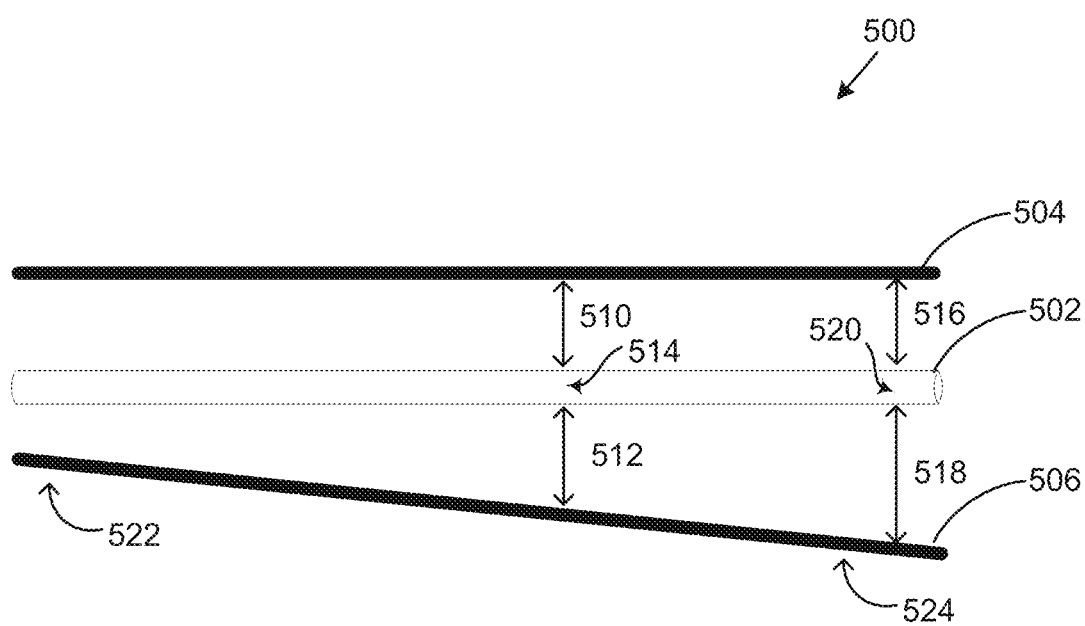
FIG. 5 is a schematic top view of another non-equidistant open transmission line, in accordance with at least one embodiment.

Referring to FIG. 5, shown therein is a schematic top view of an example non-equidistant open transmission line. The open transmission line 500 includes a first transmission line conductor 504 and a second transmission line conductor 506. Also shown in FIG. 5 is producer well 502. As shown in FIG. 5, each of the first transmission line conductor 504, the second transmission line conductor 506, and the producer well 502 are straight. Similar to open transmission line 300, the first and second transmission line conductors 504, 506 of FIG. 5 are asymmetrical with respect to the producer well 502.

The first transmission line conductor 504 and the producer well 502 are substantially parallel. That is, at all locations along the longitudinal axis, the distance between the first transmission line conductor 504 and the producer well 502 remains substantially constant. In particular, at all locations along the longitudinal axis, the first transmission line conductor 504 is laterally spaced from the producer well 502 by a first reference distance 510. For example, at location 520, the first transmission line conductor 504 is laterally spaced from the producer well 502 by a third distance 516, which is equal to the first reference distance 510.

The second transmission line conductor 506 is laterally spaced from the producer well 502 by various distances at various locations along the length of the longitudinal axis. In particular, the second transmission line conductor 506 is laterally spaced from the producer well 502 by a second reference distance 512 at location 514 and laterally spaced from the producer well 502 by a fourth distance 518 at the location 520. At location 514, the electromagnetic field generated by the first and second transmission line conductors 504, 506 has a reference shape.

As can been seen in FIG. 5, the second reference distance 512 and the fourth distance 518 are unequal. Since the fourth distance 518 is greater than the second reference distance 512, the first and second transmission line conductors 504, 506 generate an electromagnetic field at location 520 having a more elongated shape than the reference shape at location 514.

Since the second transmission line conductor 506 is straight, in order to be laterally spaced various distances from the longitudinal axis at various locations along the length of the longitudinal axis, the second transmission conductor 506 is positioned diagonally with respect to the producer well 502. That is, the distance between the second transmission line conductor 506 and the producer well 506 is smaller at a first end 522 than a second end 524.

Figure 6:
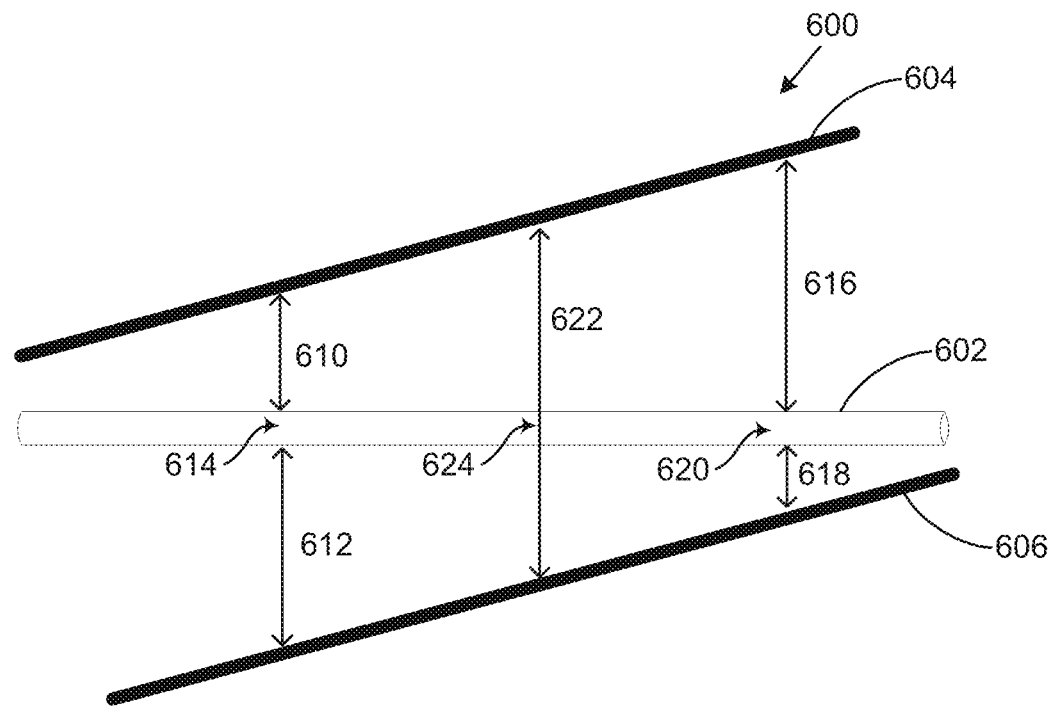
FIG. 6 is a schematic top view of another non-equidistant open transmission line, in accordance with at least one embodiment.

Referring to FIG. 6, shown therein is a schematic top view of a non-equidistant open transmission line, according to at least one embodiment. The open transmission line 600 includes a first transmission line conductor 604 and a second transmission line conductor 606. Also shown in FIG. 6 is producer well 602. As shown in FIG. 6, each of the first transmission line conductor 604, the second transmission line conductor 606, and the producer well 602 are straight.

As shown in FIG. 6, the first transmission line conductor 604 is laterally spaced from the producer well 602 by a first reference distance 610 and the second transmission line conductor 606 is laterally spaced from the producer well 602 by a second reference distance 612 to generate an electromagnetic field having a reference shape and reference position relative to the longitudinal axis at location 614. Unlike open transmission lines 200, 300, and 500, the first and second transmission line conductors 604, 606 of open transmission line conductor 600 are only spaced from the producer well 602 by the first reference distance 610 and the second reference distance 612, respectively, at one location along the length of the longitudinal axis.

Each of the first transmission line conductor 604 and the second transmission line conductor 606 are laterally spaced from the producer well 602 by various distances at various locations along the length of the longitudinal axis. In particular, the first transmission line conductor 604 and the second transmission line conductor 606 are laterally spaced from the producer well 602 by a third distance 616 and a fourth distance 618, respectively, at location 620. As shown in FIG. 6, the third distance 616 and the fourth distance 618 are unequal to the first reference distance 610 and the second reference distance 612, respectively.

While the third distance 616 is greater than the first reference distance 610, the fourth distance 618 is less than the second reference distance 612 by the same magnitude. That is, the distance between the first transmission line conductor 604 and the second transmission line conductor 606 is the same at locations 614 and 620. Accordingly, the open transmission line 600 generates an electromagnetic field having the reference shape and varied position at locations 614 and 620, similar to the open transmission line 300. The position of the electromagnetic field relative to the longitudinal axis is different at location 620 than the reference position of the electromagnetic field relative to the longitudinal axis at location 614.

Similar to the open transmission line 300, the first and second transmission line conductors 604, 606 of open transmission line 600 are substantially parallel. That is, at all locations along the longitudinal axis, the distance between the first transmission line conductor 604 and the second transmission line conductors 606 are approximately equal. For example, at location 614, the sum of the first reference distance 610 and the second reference distance 612 is substantially the same as the distance 622 between the first and second transmission line conductors 604, 606 at location 624. The distance 622 is also equal to the sum of the third distance 616 and the fourth distance 618 at location 620. Similar to open transmission lines 300, 500, the first and second transmission line conductors 604, 606 of FIG. 6 are asymmetrical with respect to the producer well 602.

Similar to the open transmission line 500, since the second transmission line conductor 606 is straight, in order to be laterally spaced various distances from the longitudinal axis at various locations along the length of the longitudinal axis, the second transmission line conductor 606 is positioned diagonally with respect to the producer well 602. Furthermore, as noted above, the first and second transmission line conductors 604, 606 are substantially parallel. Accordingly, the first transmission line conductor 604 is also positioned diagonally with respect to the producer well 602.

Figure 7:
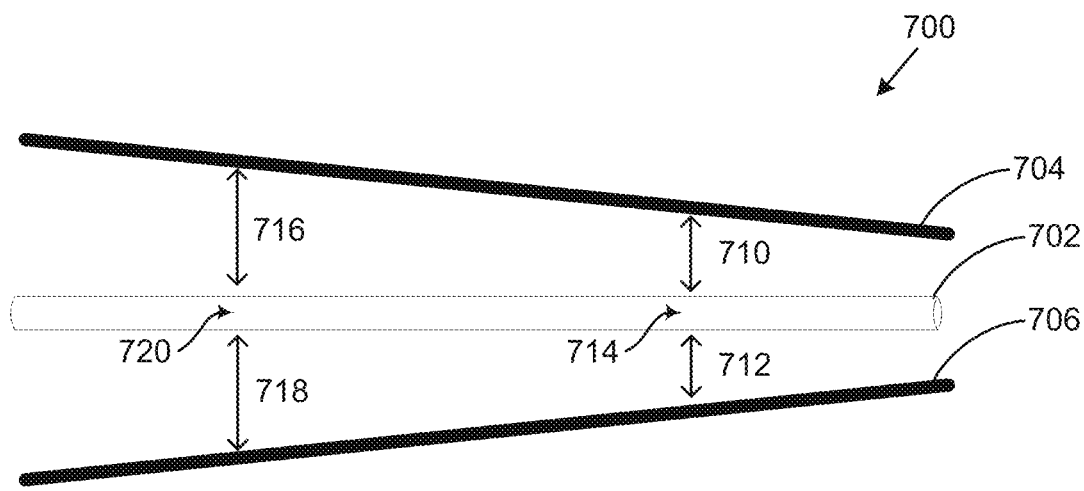
FIG. 7 is a schematic top view of another non-equidistant open transmission line, in accordance with at least one embodiment.

Referring to FIG. 7, shown therein is a schematic top view of a non-equidistant open transmission line, according to at least one embodiment. The open transmission line 700 includes a first transmission line conductor 704 and a second transmission line conductor 706. Also shown in FIG. 7 is producer well 702.

As shown in FIG. 7, each of the first transmission line conductor 704, the second transmission line conductor 706, and the producer well 702 of the open transmission line 700 are straight, similar to the open transmission lines 500, 600. In contrast to the open transmission line 600, the first and second transmission line conductor 704, 706 of open transmission line 700 are not parallel.

Similar to the open transmission line 200, the first transmission line conductor 704 and the second transmission line conductor 706 are symmetrical about the producer well 702. That is, the distance between each of the first transmission line 704 and the second transmission line 706 to the producer well 702 are equal at all locations along the longitudinal axis.

As shown in FIG. 7, the first transmission line conductor 704 is laterally spaced from the producer well 702 by a first reference distance 710 and the second transmission line conductor 706 is laterally spaced from the producer well 702 by a second reference distance 712 to generate an electromagnetic field having a reference shape and reference position relative to the longitudinal axis at location 714. Similar to open transmission line 600, the first transmission line conductor 704 of open transmission line conductor 700 is only spaced from the producer well 702 by the first reference distance 710 and the second reference distance 712, respectively at one location along the length of the longitudinal axis.

Each of the first transmission line conductor 704 and the second transmission line conductor 706 are laterally spaced the producer well 702 by various distances at various locations along the length of the longitudinal axis. In particular, the first transmission line conductor 704 and the second transmission line conductor 706 are laterally spaced from the producer well 702 by a third distance 716 and a fourth distance 718, respectively at a location 720. As can been seen in FIG. 7, the third distance 716 and the fourth distance 718 are unequal to the first reference distance 710 and the second reference distance 712, respectively. In particular, both the third distance 716 and the fourth distance 718 are greater than the first reference distance 710 and the second reference distance 712, respectively to generate an electromagnetic field having a more elongated shape than the reference shape.

Similar to the open transmission lines 500, 600, since the second transmission line conductor 706 is straight, in order to be laterally spaced various distances from the longitudinal axis at various points along the length of the longitudinal axis, the second transmission line conductor 706 is positioned diagonally with respect to the producer well 702. Furthermore, as noted above, the first and second transmission line conductors 704, 706 are symmetrical about the producer well 702. Accordingly, the first transmission line conductor 704 is also positioned diagonally with respect to the producer well 702.

It should be noted that producer wells can also have a waveform-like shape, forming at least one crest. That is, producer wells can also be undulating. For example, in the producer wells 202, 302, 502, 602, and 702 of FIGS. 2, 3, 5, 6, and 7 respectively can each be undulating. However, an undulating producer well for open transmission line 300 in FIG. 3 would require at least one crest with at least one of a different amplitude, period, or shape. The advantages of an undulating producer well is similar, that is, it can contribute to early onset of oil production and establish a heating pattern that maximizes the final recovery factor of the system.

Figure 8:
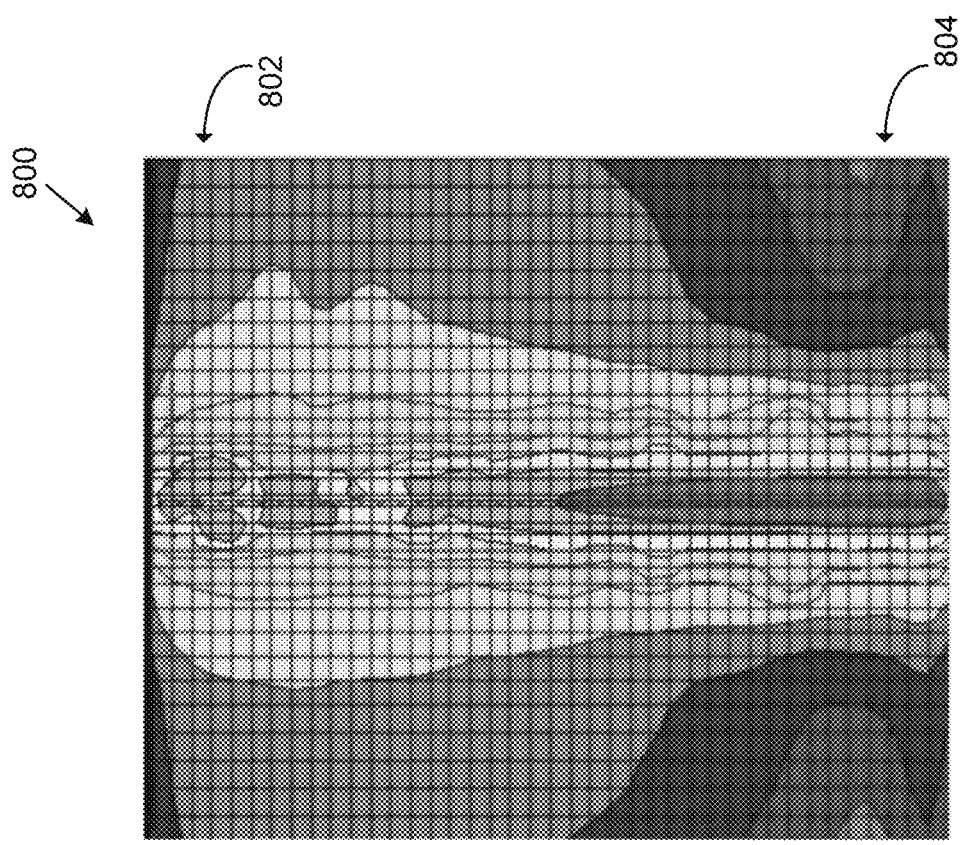
FIG. 8 is an illustration of an electromagnetic field pattern generated by an equidistant open transmission line.

Referring to FIG. 8, shown therein is an illustration 800 of an electromagnetic field pattern generated by an equidistant open transmission line, such as the apparatus shown in FIG. 1. The proximal end 802 of the open transmission line is shown at the top of the illustration and the distal end 804 of the open transmission line is shown at the bottom of the illustration.

Illustration 800 shows the EM field pattern after 700 days of continuous heating with EM power having a frequency of approximately 45 kHz, when the region between the two transmission line conductors is desiccated. As can be seen in 800, the EM field pattern of the open transmission line is guided mainly by a standing wave on the transmission line.

A near-field maximum, indicated by red shading, is located close to the distal end 804 of the transmission line. A far-field maximum is located close to the proximal end 802 of the transmission line. The presence of the near-field maximum and far-field maximum is indicative of a non-uniform heating pattern. Non-uniform heating can contribute to overheating of the distal end 804 of the transmission line and unproduced oil in the reservoir at proximal end 802 of the transmission line. Oil may remain unproduced at the proximal end 802 because strong heating at the distal end 804 results in a non-uniform steam chamber. Namely, a strong steam chamber at the distal end 804 and a weak steam chamber at the proximal end 802. The steam chamber at the distal end 802 may come in contact with the producer well, causing the oil production rate to drop below economical levels before the oil form the proximal end 802 is produced.

Figure 9:
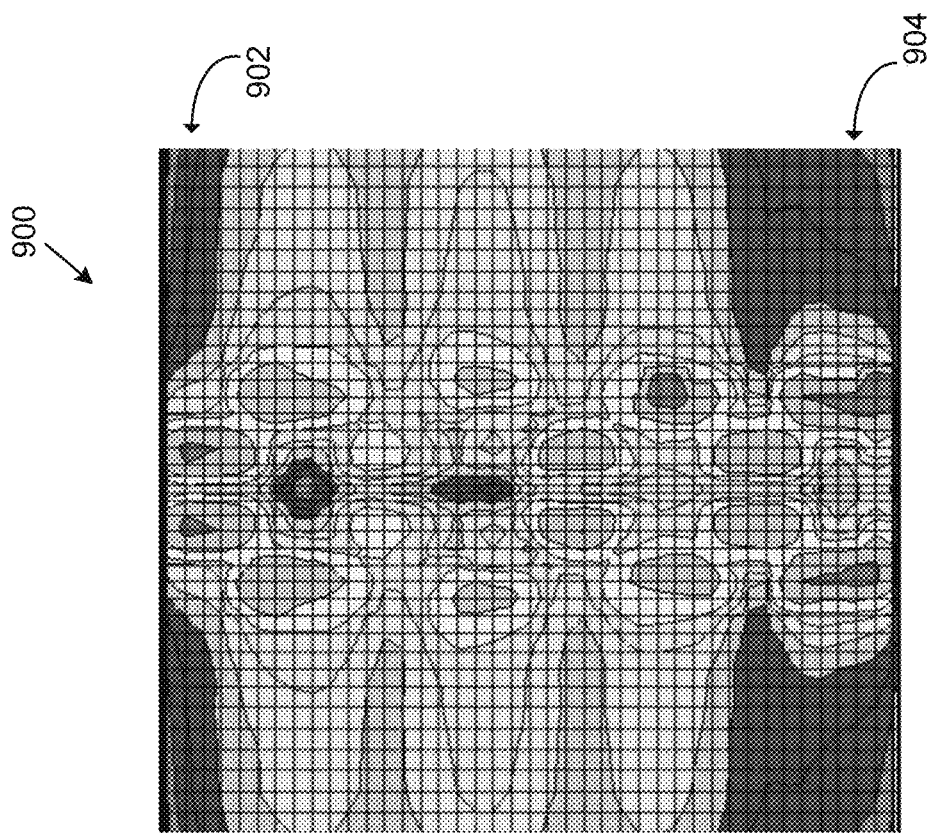
FIG. 9 is an illustration of an electromagnetic field pattern generated by a non-equidistant open transmission line.

Referring to FIG. 9, shown therein is an illustration 900 of an electromagnetic field pattern generated by a non-equidistant open transmission line. The proximal end 902 of the open transmission line is shown at the top of the illustration and the distal end 904 of the open transmission line is shown at the bottom of the illustration.

Illustration 900 shows the EM field pattern after 1500 days of continuous heating with EM power having a frequency of approximately 45 kHz, when the region between the two transmission line conductors is desiccated. As can be seen in 900, the EM field pattern of the open transmission line is guided mainly by the geometry of the non-equidistant open transmission line, rather than the standing wave on the transmission line of FIG. 8. The EM field pattern of illustration 900 has a sinusoidal distribution that follows the geometry of the non-distant open transmission line. The EM field pattern of illustration 900 has a larger number of near-field and far-field maxima. However, the near-field and far-field maxima of illustration 900 are weaker than the near-field maximum of illustration 800. Thus, the non-equidistant open transmission line can be said to have a more uniform EM field pattern than the equidistant open transmission line. As a result, there is less risk of overheating with the non-equidistant open transmission line.

Figure 10:
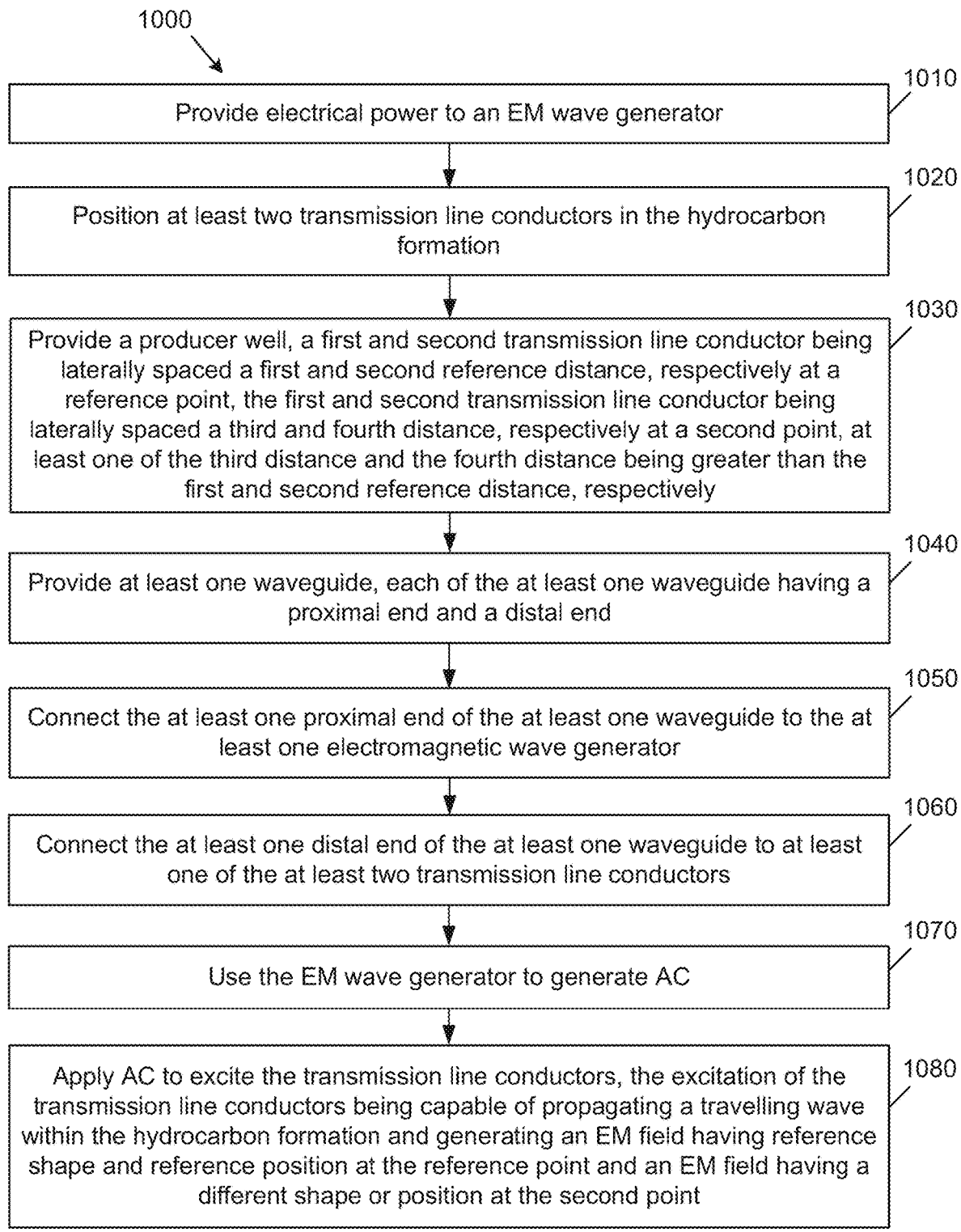
FIG. 10 is a flowchart diagram of an example method for electromagnetic heating of a hydrocarbon formation, in accordance with at least one embodiment.

Referring now to FIG. 10, shown therein is a flowchart diagram of an example method 1000 for electromagnetic heating of a hydrocarbon formation, in accordance with at least one embodiment.

Method 1000 begins with providing electrical power to at least one EM wave generator at 1010.

At 1020, at least two transmission line conductors are positioned in the hydrocarbon formation. The at least two transmission line conductors include at least a first transmission line conductor and a second transmission line conductor.

At 1030, a producer well is provided in the hydrocarbon formation, defining a longitudinal axis. The first and second transmission line conductors are laterally spaced from the producer well by a first and second reference distance, respectively at at least one reference location along the length of the longitudinal axis. The first and second transmission line conductors are laterally spaced from the producer well by a third distance and a fourth distance, respectively at at least a second location. At least one of the third distance and the fourth distance are greater than the first reference distance and the second reference distance, respectively.

At 1040, at least one waveguide is provided. Each of the at least one waveguide can have a proximal end and a distal end. At 1050, the at least one proximal end of the at least one waveguide can be connected to the at least one EM wave generator. At 1060, the at least one distal end of the at least one waveguide can be connected to at least one of the at least two transmission line conductors.

At 1070, the at least one EM wave generator can be used to generate high frequency alternating current.

At 1080, the high frequency alternating current from the at least one EM wave generator is applied to the at least two transmission line conductors to excite the at least two transmission line conductors. The excitation of the at least two transmission line conductors propagates a travelling wave within the hydrocarbon formation and generates an electromagnetic field having a reference shape and reference position relative to the longitudinal axis at the reference location and an electromagnetic field having at least one of a second shape or a different position at the at least one second location, the second shape being more elongated than the reference shape.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. An apparatus for electromagnetic heating of an underground hydrocarbon formation, the apparatus comprising:
   (a) an electrical power source;
   (b) at least one electromagnetic wave generator for generating alternating current, the at least one electromagnetic wave generator being powered by the electrical power source;
   (c) at least two transmission line conductors positioned in the hydrocarbon formation, the at least two transmission line conductors having a proximal end and a distal end, the proximal end of the at least two transmission line conductors being coupled to the at least one electromagnetic wave generator, the at least two transmission line conductors being excitable by the alternating current to propagate a travelling wave within the hydrocarbon formation from the proximal end of the at least two transmission line conductors to the distal end of the at least two transmission line conductors, the at least two transmission line conductors comprising a first transmission line conductor and a second transmission line conductor;
   (d) at least one waveguide for carrying the alternating current from the at least one electromagnetic wave generator to the at least two transmission line conductors, each of the at least one waveguide having a proximal end and a distal end, the proximal end of the at least one waveguide being connected to the at least one electromagnetic wave generator, the distal end of the at least one waveguide being connected to at least one of the at least two transmission line conductors; and (e) a producer well positioned between the at least two transmission line conductors and at a greater depth than at least one of the at least two transmission line conductors to receive heated hydrocarbons via gravity;
wherein:
  the producer well defines a longitudinal axis, each of the at least two transmission line conductors extend along the longitudinal axis, a proximal end of the longitudinal axis corresponds to the proximal end of the at least two transmission line conductors;
  at a reference location along the length of the longitudinal axis and proximal to a ground surface, the first transmission line conductor is laterally spaced from the producer well by a first reference distance and the second transmission line conductor is laterally spaced from the producer well by a second reference distance to generate an electromagnetic field having a reference shape and a reference position with respect to the longitudinal axis;
  at the distal end of the transmission line conductors, the first transmission line conductor is laterally spaced from the producer well by a third distance and the second transmission line conductor is laterally spaced from the producer well by a fourth distance, at least one of (i) the third distance being greater than the first reference distance, and (ii) the fourth distance being greater than the second reference distance, to generate an electromagnetic field having a shape that is more elongated than the reference shape; and
  a shape of the first transmission line conductor along the longitudinal axis comprises at least a first crest and a second crest, the first crest defining a first plane having a first roll angle with respect to the producer well, the second crest defining a second plane having a second roll angle with respect to the producer well, a magnitude of the first roll angle being unequal to a magnitude of the second roll angle.

2. The apparatus of claim 1, wherein the first crest and the second crest have unequal amplitudes.

3. The apparatus of claim 1, wherein a shape of the second transmission line conductor along the longitudinal axis comprises at least one crest.

4. The apparatus of claim 3, wherein the at least one crest of the second transmission line conductor defines at least a third plane having a third roll angle with respect to the producer well.

5. The apparatus of claim 4, wherein a magnitude of the first roll angle is approximately equal to a magnitude of the third roll angle.

6. The apparatus of claim 1, wherein at a second location along the length of the longitudinal axis, the first transmission line conductor is laterally spaced from the producer well by a fifth distance and the second transmission line conductor is laterally spaced from the producer well by a sixth distance, at least one of (i) the fifth distance being less than the first reference distance, and (ii) the sixth distance being less than the second reference distance, to generate an electromagnetic field at the second location having a third shape that is less elongated than the reference shape.

* * * * *